United States Patent
Zvara

(10) Patent No.: US 11,242,147 B2
(45) Date of Patent: Feb. 8, 2022

(54) AERIAL VEHICLE IMPLEMENT HITCH ASSEMBLY

(71) Applicant: PRECISION DRONE SERVICES INTELLECTUAL PROPERTY, LLC, Medina, OH (US)

(72) Inventor: Stephen Zvara, Cleveland, OH (US)

(73) Assignee: PRECISION DRONE SERVICES INTELLECTUAL PROPERTY, LLC, Medina, OH (US)

(*) Notice: Subject to any disclaimer, the term of this patent is extended or adjusted under 35 U.S.C. 154(b) by 342 days.

(21) Appl. No.: 16/119,010

(22) Filed: Aug. 31, 2018

(65) Prior Publication Data

US 2019/0061944 A1    Feb. 28, 2019

Related U.S. Application Data

(60) Provisional application No. 62/552,564, filed on Aug. 31, 2017.

(51) Int. Cl.
| | |
|---|---|
| *B64D 1/08* | (2006.01) |
| *B64D 1/00* | (2006.01) |
| *B64D 1/02* | (2006.01) |
| *B64D 1/12* | (2006.01) |
| *B64D 1/22* | (2006.01) |
| *B64D 9/00* | (2006.01) |
| *B64C 39/02* | (2006.01) |

(52) U.S. Cl.
CPC ............... *B64D 1/08* (2013.01); *B64D 1/00* (2013.01); *B64D 1/02* (2013.01); *B64D 1/12* (2013.01); *B64D 1/22* (2013.01); *B64C 39/024* (2013.01); *B64C 2201/126* (2013.01); *B64C 2201/128* (2013.01); *B64C 2201/141* (2013.01); *B64C 2201/146* (2013.01); *B64D 9/00* (2013.01)

(58) Field of Classification Search
CPC ... B64D 1/08; B64D 1/00; B64D 1/02; B64D 1/12; B64D 1/22; B64C 2201/126; B64C 2201/128
See application file for complete search history.

(56) References Cited

U.S. PATENT DOCUMENTS

| | | | |
|---|---|---|---|
| 6,457,761 B1 | 10/2002 | Benoit | |
| 8,087,315 B2 | 1/2012 | Goosen et al. | |

(Continued)

FOREIGN PATENT DOCUMENTS

| | | |
|---|---|---|
| CN | 204110368 | 1/2015 |
| CN | 204527648 | 8/2015 |

(Continued)

OTHER PUBLICATIONS

International Search Report for PCT/US2018/049063 dated Jan. 1, 2019, 5 pages.

*Primary Examiner* — Jessica B Wong
(74) *Attorney, Agent, or Firm* — McDonald Hopkins LLC

(57) ABSTRACT

A hitch mount assembly for an unmanned aerial vehicle is shown and described. The hitch mount assembly may include a mount body operatively engagable with an aerial vehicle such as an unmanned aerial vehicle (UAV), where the mount body has an attachment feature to be selectively secured to the UAV and allow for selective attachment to a plurality of UAVs. A stabilizing unit attached to the mount body. The stabilizing unit may include a gimbal mounted gyro stabilization unit. A connection plate attached to the stabilizing unit. The connection plate may be attachable to various implement assemblies.

8 Claims, 9 Drawing Sheets

(56) References Cited

U.S. PATENT DOCUMENTS

| | | |
|---|---|---|
| 8,162,263 B2 | 4/2012 | Wong et al. |
| 8,251,307 B2 | 8/2012 | Goossen |
| 8,752,796 B2 | 6/2014 | Occhiato et al. |
| 9,280,038 B1 | 3/2016 | Pan et al. |
| 9,346,547 B2 | 5/2016 | Patrick et al. |
| 9,382,003 B2 | 7/2016 | Burema et al. |
| 9,487,292 B2 | 11/2016 | Phud'Homme-Lacroix |
| 9,493,232 B2 | 11/2016 | Wang et al. |
| 9,567,081 B1 | 2/2017 | Beckman et al. |
| 9,573,684 B2 | 2/2017 | Kimchi et al. |
| 9,630,715 B2 | 4/2017 | Takayama |
| 9,688,404 B1 | 6/2017 | Buchmueller et al. |
| 9,714,012 B1 | 7/2017 | Hoareau et al. |
| 2012/0153087 A1 | 6/2012 | Collette et al. |
| 2016/0023761 A1 | 1/2016 | McNally |
| 2016/0198088 A1 | 7/2016 | Wang et al. |
| 2016/0207627 A1 | 7/2016 | Hoareau et al. |
| 2017/0081043 A1 | 3/2017 | Jones et al. |
| 2017/0144759 A1 | 5/2017 | Chiu |
| 2017/0203857 A1 | 7/2017 | O'Toole |
| 2017/0253335 A1 | 9/2017 | Thompson et al. |
| 2017/0267348 A1 | 9/2017 | Sweeny et al. |

FOREIGN PATENT DOCUMENTS

| | | |
|---|---|---|
| CN | 204713430 | 10/2015 |
| CN | 105035336 | 11/2015 |
| CN | 204776056 | 11/2015 |
| CN | 204871622 | 12/2015 |
| CN | 204871626 | 12/2015 |
| CN | 204895855 | 12/2015 |
| CN | 105438491 | 3/2016 |
| CN | 105697957 | 6/2016 |
| CN | 106081113 | 11/2016 |
| CN | 106114879 | 11/2016 |
| CN | 205872497 | 1/2017 |
| CN | 205891249 | 1/2017 |
| CN | 106428598 | 2/2017 |
| CN | 205931259 | 2/2017 |
| CN | 205971822 | 2/2017 |
| CN | 206012972 | 3/2017 |
| CN | 106585990 | 4/2017 |
| CN | 206107589 | 4/2017 |
| CN | 106628217 | 5/2017 |
| CN | 106672240 | 5/2017 |
| CN | 106794902 | 5/2017 |
| CN | 206196773 | 5/2017 |
| CN | 106864752 | 6/2017 |
| CN | 106892117 | 6/2017 |
| CN | 106986031 | 7/2017 |
| CN | 206299660 | 7/2017 |
| CN | 107108042 | 8/2017 |
| CN | 206476116 | 9/2017 |
| DE | 102010010508 | 9/2011 |
| FR | 3040688 | 3/2017 |
| IN | 201741025926 | 7/2017 |
| KR | 101780454 | 9/2017 |
| WO | 2015177760 | 11/2015 |
| WO | 20160185572 | 11/2016 |
| WO | 20160190994 | 12/2016 |
| WO | 201700299 | 1/2017 |
| WO | 201708533 | 1/2017 |
| WO | 20170019728 | 2/2017 |
| WO | 20170069524 | 4/2017 |
| WO | 201796392 | 6/2017 |
| WO | 20170099058 | 6/2017 |

AERIAL VEHICLE IMPLEMENT HITCH ASSEMBLY

CROSS-REFERENCE TO RELATED APPLICATIONS

This application claims priority to U.S. Provisional Patent App. No. 62/552,564 entitled "AERIAL VEHICLE IMPLEMENT HITCH ASSEMBLY" filed on Aug. 31, 2017 which is hereby incorporated by reference in its entirety.

FIELD OF INVENTION

The present invention generally relates to a hitch assembly to selectively attach an implement to an aerial vehicle, and more particularly to an unmanned aerial vehicle.

BACKGROUND

The use of aerial vehicles for delivering goods and products, surveillance, and other services is rapidly expanding, especially for unmanned aerial vehicles (UAVs). UAVs are convenient for rapid point-to-point delivery and/or unique aerial perspectives of a location. Further, aerial vehicles such as UAVs may be used to perform various tasks having implements such as imaging recording devices attached thereto.

However, drawbacks exist regarding the operation of aerial vehicles and their ability to modify their function without substantial downtime. There is a need to provide an aerial vehicle or a device for an aerial vehicle that may allow for selective attachment to various implement devices to modify the function of that aerial vehicle while maintaining structural stability during flight, as well as maintaining implement function, control, and communication. Thus, there is a need for an improved attachment mechanism to allow an aerial vehicle to be selectively attached to a variety of implement devices.

SUMMARY

A hitch mount assembly for an aerial vehicle is shown and described. The hitch mount assembly includes a mount body operatively engagable with an aerial vehicle, a rotation unit attached to the mount body and a connection plate. The connection plate may be attached to the rotation unit wherein the connection plate is attachable to a plurality of implement assemblies and is configured to allow electronic communication between the aerial vehicle and the plurality of implement assemblies when attached to the connection plate. The hitch mount assembly further comprising a control unit that is configured to control actuation, rotation, or movement of an implement device associated with an implement assembly attached to the connection plate. The implement assemblies may include at least one implement device such as imaging device, surveying device, agricultural tank, seeder, fertilizer sprayer, spreader, chemical/fertilizer instrument, projectile producing assembly, gurney, search and rescue equipment, sonar buoy, construction equipment, crane, and lifting device. At least one clamping mechanism may be provided to selectively secure the connection plate to one of the implement assemblies. The control unit may be attached to the hitch mount assembly or the implement assembly. The control unit may be in communication with at least one of the mount body, rotation unit, connection plate and clamping mechanism. The control unit may be in wireless communication with a network to allow for electronic communication with a remote computing device. The implement assembly and the associated implement device may be in electrical communication with the control unit and the aerial vehicle once the implement assembly is attached to the hitch mount assembly. Angular movement and rotational movement of the rotatable unit relative to the mount body may be controlled by said control unit to align the connection plate to the implement assembly or to operate the implement device. The aerial vehicle may be an unmanned aerial vehicle (UAV) and may be configured to automatically align the connection plate relative to an alignment plate attached to at least one of the implement assemblies.

In another embodiment, provided is a hitch mount assembly for an aerial vehicle comprising a mount body selectively attached to an aerial vehicle, a rotation unit rotatably and pivotally attached to the mount body, and a connection plate attached to the rotation unit. A clamping mechanism may be attached to said connection plate, wherein the clamping member is automatically operable to move between an open position to align or detach the connection plate relative to an implement assembly and a closed position to secure the connection plate to the implement assembly. An attachment member may be attached to said implement assembly, wherein the connection plate includes at least one electrical contact and said attachment member includes at least one electrical contact wherein the electrical contact on the connection plate is configured to be aligned with the electrical contact on the attachment member to establish electronic communication between the hitch mount assembly and the implement assembly. The aerial vehicle may be an unmanned aerial vehicle (UAV) that is remotely controlled or automatically programmed to align the connection plate with the implement assembly and is remotely controlled or automatically programmed to selectively position the clamping member between the open position and closed position. The mount body and the rotatable unit may include a ball and socket coupling orientation. The mount body may include a socket that defines a cavity with a cavity opening to receive a head portion of the rotatable unit within the cavity wherein the position of the rotatable unit relative to the mount body may be controlled by the control unit in communication with at least one electromagnet on the mount body or the rotatable member. The control unit may be in electronic communication with at least one of the aerial vehicle, mount body, rotatable unit, and clamping mechanism, wherein the control unit may be in wireless communication with a network to allow for electronic communication with a remote computing device. The angular and rotational position of the rotatable unit relative to the mount body may be manually or automatically controlled via the control unit. The connection plate may include an electromagnet that is selectively controlled to align the connection plate relative to the implement assembly.

In one embodiment, the clamping mechanism further comprises at least one actuator attached to the connection plate, the actuator includes a piston translatable between and extended position and a retracted position to place the clamping mechanism in the open position or the close position. The clamping mechanism may include a slide track that may be attached to the connection plate, a first link may be pivotally attached to the piston, a joint may be pivotally attached to the first link and a second link, and the second link may be attached to a clamp member. The first and second links may each include first and second guide rollers aligned within a slot defined within the slide track. An alignment bar may extend from the joint to a position along the piston wherein the first and second links may be moveable to place the clamping mechanism in said closed position and said open position. In said closed position, the joint may be located outwardly from the connection plate and in said open position, the joint may be located inwardly towards the connection plate.

In another embodiment, provided is a method of attaching an implement assembly to an aerial vehicle. The steps include providing a hitch mount assembly that includes a mount body attached to an aerial vehicle and a rotation unit attached to the mount body, a connection plate attached to the rotation unit. The aerial vehicle may be operated manually or automatically to align the connection plate with an attachment member positioned on an implement assembly. Electrical contacts on the connection plate may be aligned with electrical contacts on the attachment member. A clamping mechanism may be actuated from an open position to a closed position to secure the connection plate to the attachment member. The angle and position of the rotation unit relative to the mount body may be controlled to align the connection plate with said attachment member. An electromagnet may be selectively operated to align the position of the connection plate with said attachment member. After actuating the clamping mechanism, the hitch mount assembly may be calibrated to verify that electrical data connection or power connection has been established between the aerial vehicle and the implement assembly.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined, switched, or altered without departing from the scope of the present teachings, e.g., features of each embodiment disclosed herein may be combined, switched, or replaced with features of the other embodiments disclosed herein. As such, the following description is presented by way of illustration only and should not limit in any way the various alternatives and modifications that may be made to the illustrated embodiments and still be within the spirit and scope of the present teachings.

Figure 1:
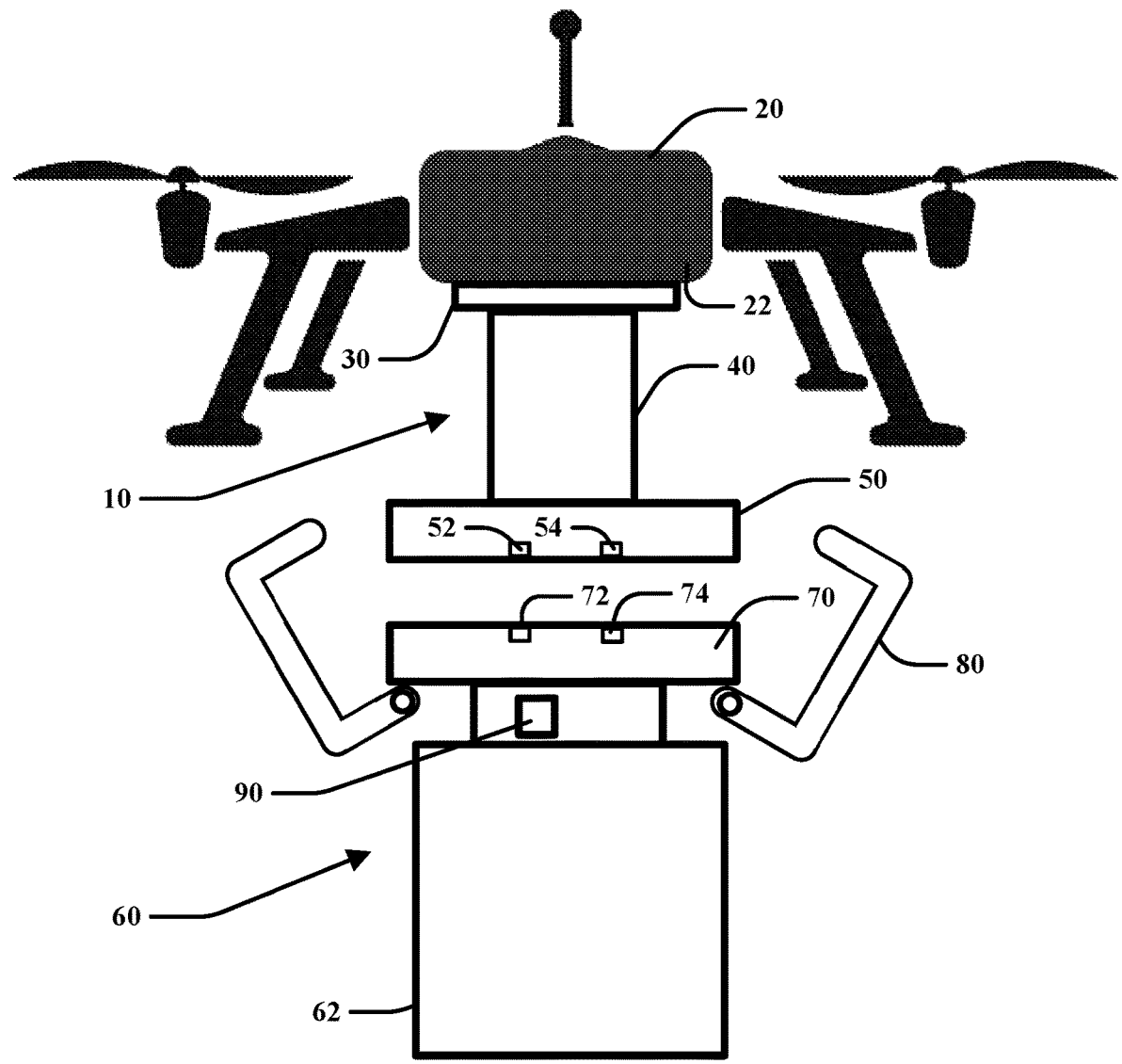
FIG. 1 is a schematic diagram of embodiments of an aerial vehicle implement hitch mount assembly being selectively secured to an implement in accordance with the instant disclosure.

As illustrated by FIG. 1, provided is a hitch mount assembly 10 for an aerial vehicle 20. In a preferred embodiment, the aerial vehicle 20 may be an unmanned aerial vehicle (UAV) but this disclosure is not limited as the hitch mount assembly 10 may be used with various different types of aerial vehicles such as helicopters, hovercrafts, airplanes, balloons, etc. and this disclosure is not limiting in this regard. In one embodiment, the hitch mount assembly 10 is configured to extend from an aerial vehicle and automatically form a secured attachment to various implement devices while allowing structural stability during flight and allowing for electronic communication between the implement device and the aerial vehicle. In one embodiment, the secured attachment and detachment may be formed automatically without manual assistance from a person and be performed by the operation of the aerial vehicles and implement devices on their own.

Figure 2:
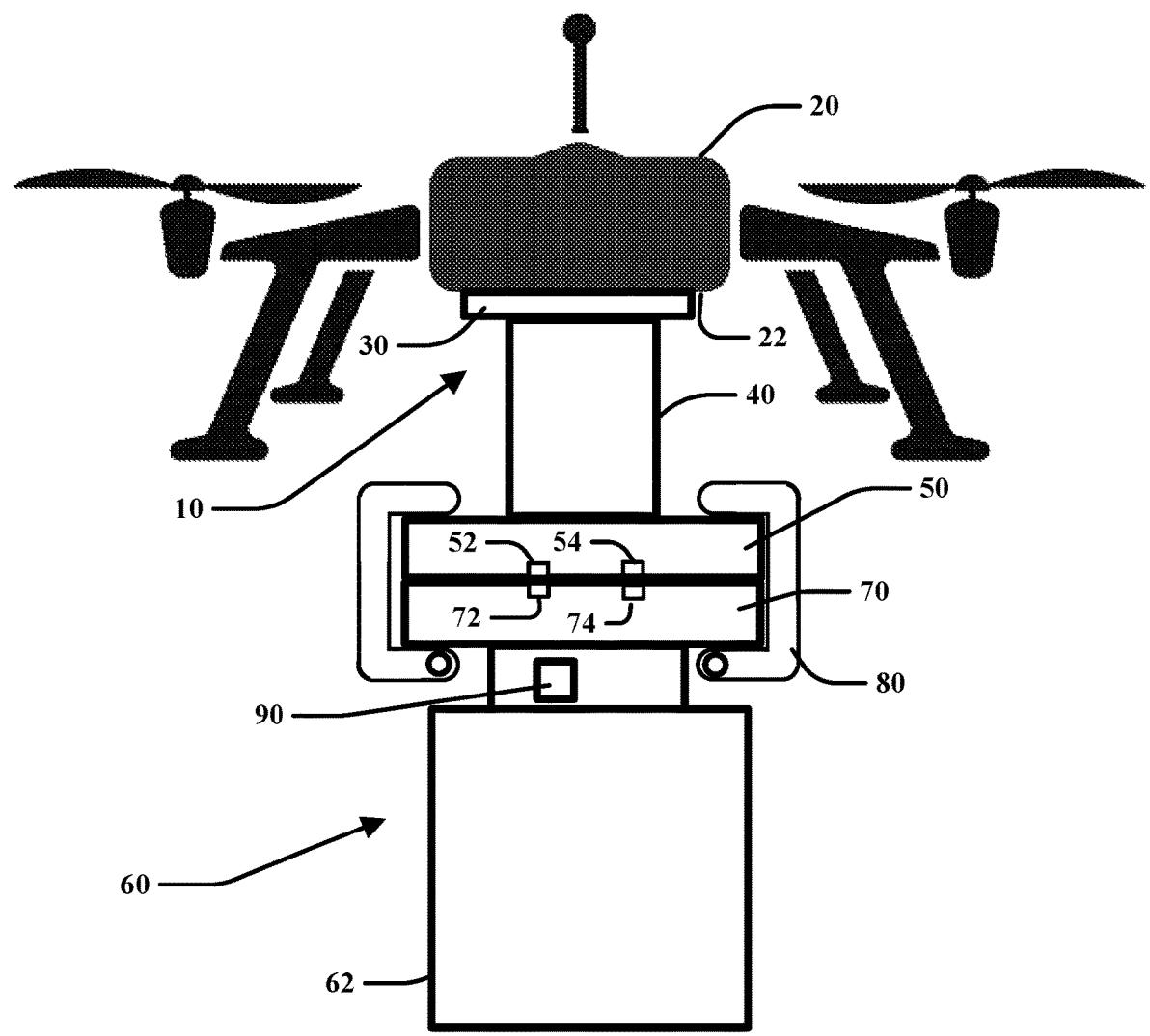
FIG. 2 is a schematic diagram of embodiments of the aerial vehicle implement hitch mount assembly secured to the implement assembly in accordance with the instant disclosure.
Figure 3:
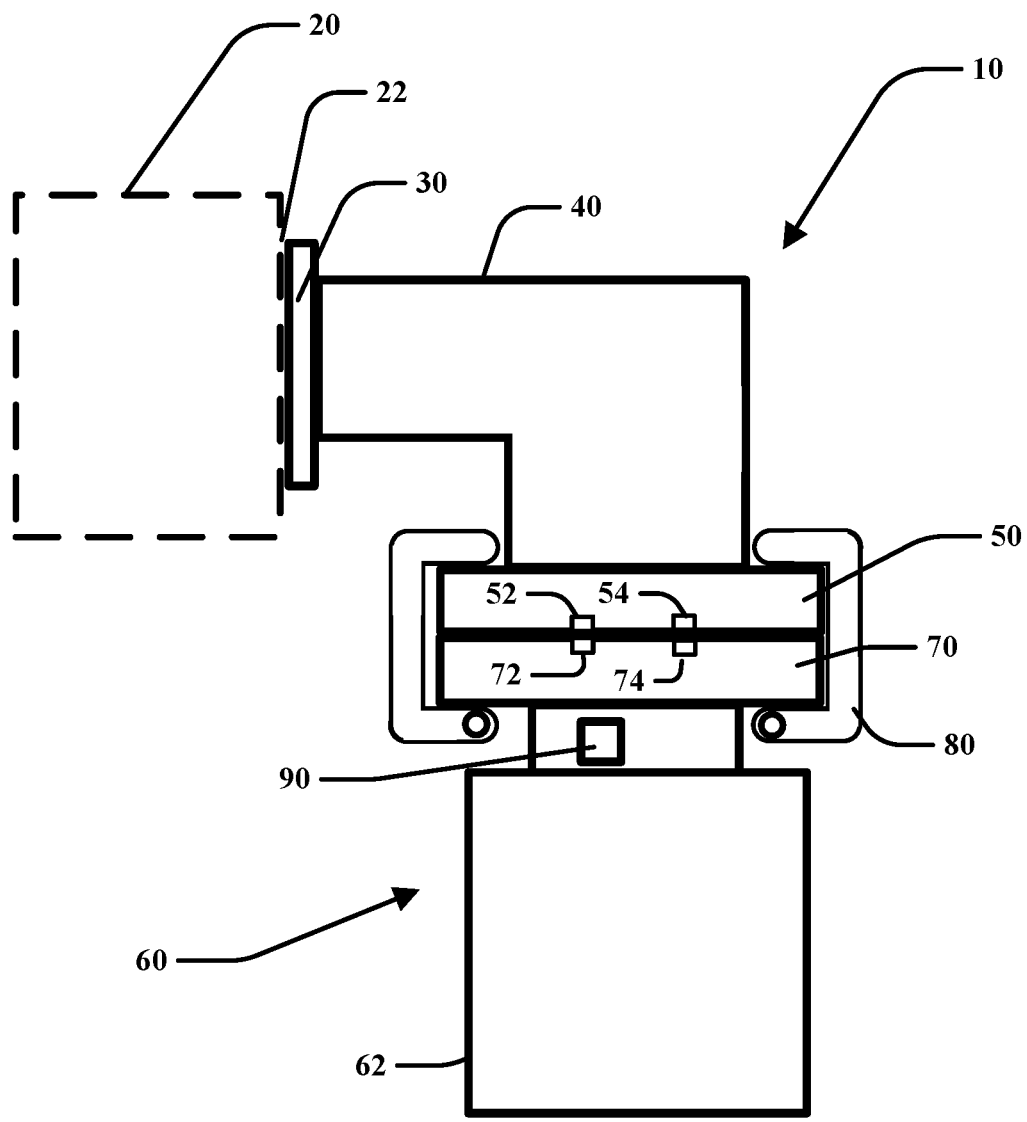
FIG. 3 is a schematic diagram of embodiments of the aerial vehicle hitch mount assembly secured to the implement assembly in accordance with the instant disclosure.
Figure 4:
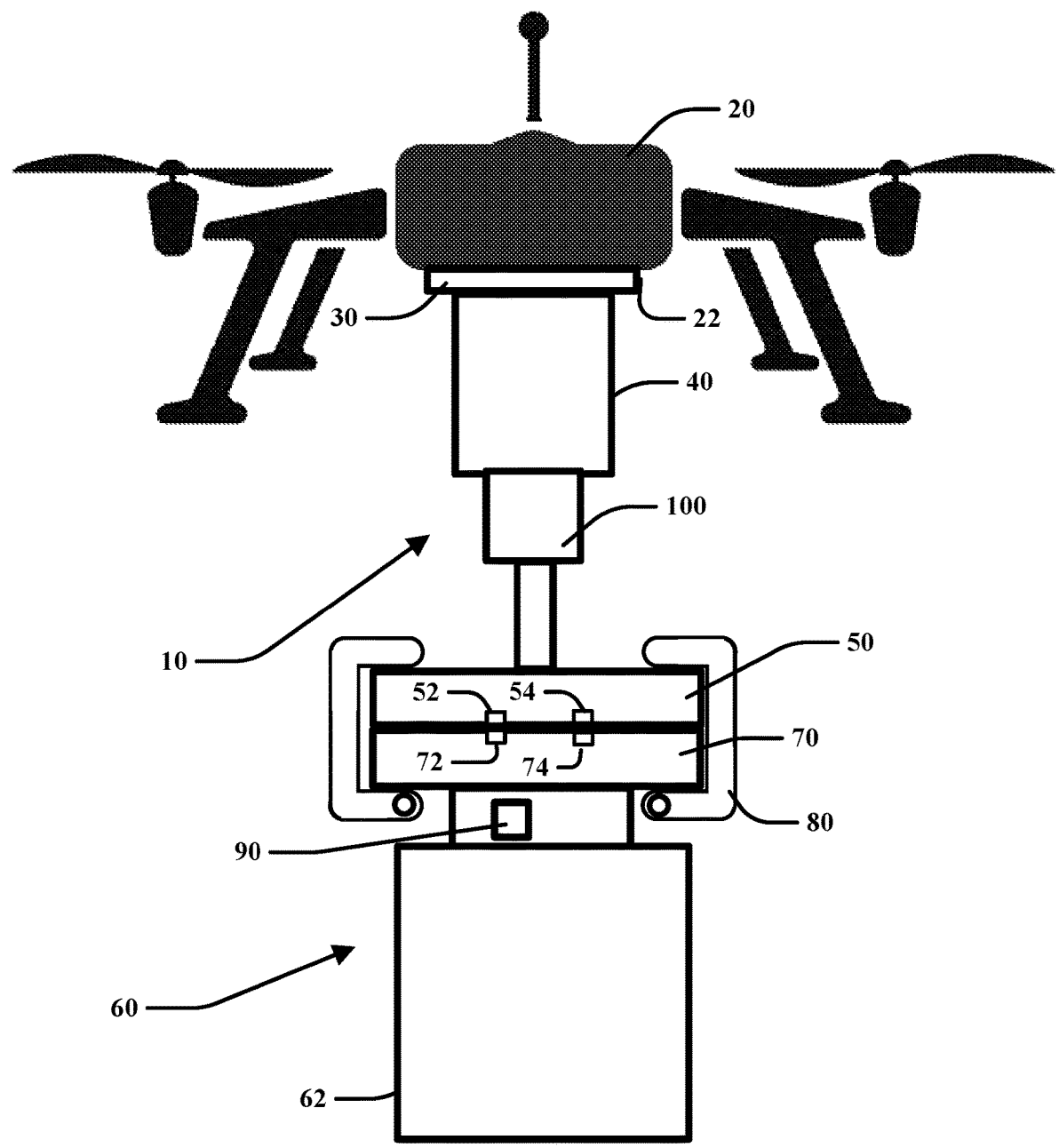
FIG. 4 is a schematic diagram of embodiments of the hitch mount assembly secured to the implement assembly in accordance with the instant disclosure.

The hitch mount assembly 10 may include a mount body 30 that is connected to an attachment portion 22 of the aerial vehicle 20. The attachment portion 22 of the aerial vehicle 20 may be a surface along a bottom portion as illustrated by FIGS. 1, 2, and 3 or the attachment portion 22 may be along a side as illustrated by FIG. 4. However, a variety of other configurations are contemplated by this disclosure and the configuration of the attachment portion 22 and the mount body 30 is not limited herein. The attachment portion 22 may be along any surface or structural member that is part of the aerial vehicle 20 and this disclosure is not limited. The position of the attachment portion 22 may be dependent on the type of implement to be selectively attached to the hitch mount assembly 10.

The mount body 30 may be a universal mount that may be selectively attached to a plurality of aerial vehicles such as a plurality of UAVs that may be configured to operate as a system. The mount body 30 may have a particular shape that is complimentary to a shape of the attachment portion 22 of the aerial vehicle 20 in which secured attachment may be made therebetween. The mount body 30 may include an attachment feature to allow for selective secured attachment to the attachment portion 22 of the aerial vehicle 20. The attachment feature may include conventional fasteners, magnets, bolts, welds or may be formed integrally with the surface of the aerial vehicle 20 to ensure a sound structural connection. The hitch mount assembly 10 may also be in electronic communication with the aerial vehicle 20 wherein the electrical connection may be through electrical contacts that extend through the mount body 30, may extend around the mount body 30, or may be made by a wireless connection therebetween.

The hitch mount assembly 10 and its components described herein may be made from a light weight but structurally stable material such as a metal or composite metal alloy that includes titanium, aluminum, stainless steal or other lightweight material such as carbon fiber. Additionally, the components described herein may be made by additive manufacturing and various materials utilized in those processes.

A rotatable unit 40 may be attached to the mount body 30. The rotatable unit 40 may be a stabilizing unit such as a gimbal mounted gyro stabilization unit. A connection plate 50 may be rigidly attached to the rotatable unit 40. The connection plate 50 may be selectively attachable to various implement assemblies 60. The rotatable unit 40 may allow for rotation between the connection plate 50 and the aerial vehicle 20. It may also allow for movements along various degrees of freedom including tilt, rotation, yaw, and movement relative to various axes of the rotatable unit 40. Further, in another embodiment, the hitch mount assembly 10 may include a telescoping member 100 as illustrated by FIG. 4. The telescoping member 100 optionally be included with the implement assembly 60.

The relative position of the rotatable unit 40 may be tracked and controlled by various ways. In one embodiment, the movement of the rotatable unit 40 may be controlled by a motor or a plurality of motors. Additionally, the rotatable unit 40 may be tracked via global positioning system (GPS) that would allow for precise control and tracking of its position, and the position of the implement assemblies 60 relative to the aerial vehicle 20.

Figure 5:
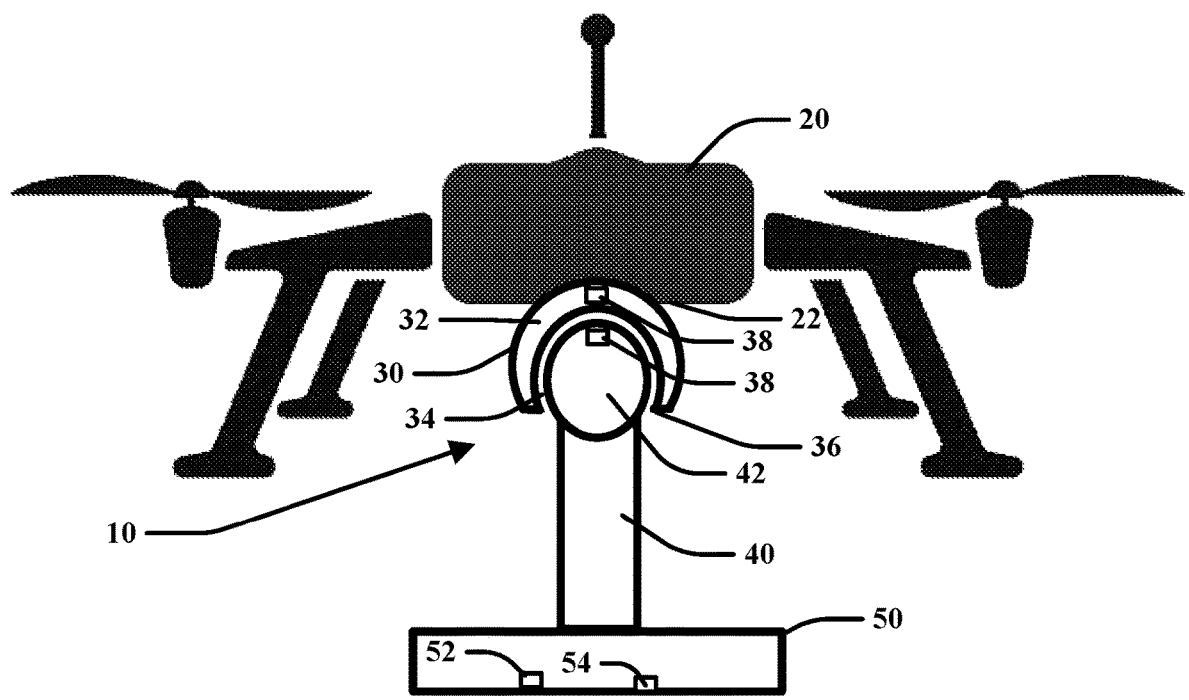
FIG. 5 is a schematic diagram of an embodiment of the hitch mount assembly secured to the aerial vehicle in accordance with the instant disclosure.

As illustrated by FIG. 5, the configuration of the mount body 30 and the rotatable unit 40 may include a ball and socket coupling orientation. In this embodiment, the mount body 30 may include a socket 32 that defines a cavity 34 to receive a head portion 42 of the rotatable unit 40. The head portion 42 may be a partially circular or spherical end that is received within the cavity 34 of the socket 32. The head portion may rotate and move within the cavity 32 to allow for rotary and angular motion in every direction within certain limits. The head portion 42 may be structurally secured within the cavity 34 to prevent unwanted detachment. Additionally, the limitation on angular movement may be defined by the size and shape of a cavity opening 36 of the socket 32. In one embodiment, the cavity opening 36 may allow for a degree of angular movement freedom in the range of about 30 to 45 degrees. Further, the remote or automatic control of the movement between the rotatable unit 40 and the mount body 30 may be controlled by electromagnets 38 positioned within the socket 32 and/or about the head portion 42 wherein the angular and rotational position of the rotatable unit 40 may be remotely or automatically controlled for precision placement. The remote control of the angular and rotational movement of the rotatable unit 40 relative to the mount body 30 may be controlled by a control unit 90 as will be described below.

The implement assemblies 60 may include any number of implement devices 62 that are desirable to be utilized with an aerial vehicle. For example, implement devices 62 may include sensor(s), probe(s), or imaging equipment such as a camera and other various surveying equipment. It is also contemplated that the implement devices 62 may include agriculture related equipment such as tanks, seeders, sprayers, spreaders, or various other chemical/fertilizer instruments. Further, implement devices 62 may include various payloads including projectile producing assemblies for military applications and the like. Some other implement assemblies 60 and devices 62 may include gurneys, search and rescue equipment, sonar buoys, construction equipment, cranes, and lifting equipment. The implement assemblies 60 and the associated implement devices 62 may be in wireless communication with a network to allow for communication or control from a remote location. Further, the implement assemblies 60 and associated implement devices 62 may be in electrical communication with the aerial vehicle 20 once attached to the hitch mount assembly 10.

The implement assembly 60 may include an adapter member 70 for selective attachment to the connection plate 50. The connection plate 50 may include at least one electrical contact 52, 54 and the adapter member 70 may include at least one electrical contact 72, 74. As the connection plate 50 is attached to the adapter member 70, corresponding electrical contacts 52, 72 and 54, 74 may be aligned in connection to allow for electrical communication therebetween. Multiple electrical contacts may be utilized to allow for both a data connection as well as for power connection. The described configuration is not limited to just two corresponding electrical contacts as any number and configuration of electrical communication is contemplated by this disclosure. In one embodiment, the electrical connections may include 3 phase AC power and the data connection may include a 12 to 16 pin data contacts.

As illustrated by FIG. 2, the connection plate 50 may be an electro magnetic member that is powered to magnetically align and attach to the attachment member 70. Further, a clamping mechanism 80 may selectively secure the connection plate 50 of the hitch mount assembly 10 to the adapter member 70 of the implement assembly 60. The clamping mechanism 80 may include an over center cam assembly 82 having arms that rotate over the edges of the connection plate 50 and the adapter member 70 to secure the connection plate 50 to the adapter member 70. The over center cam assembly may be rotatably attached to the implement assembly 60 as illustrated by FIG. 1 or may be rotatably attached to the hitch mount assembly 10 (not shown).

The clamping mechanism 80 may have a variety of structural configurations and this disclosure is not limited in this regard. The clamping mechanism 80 may also include various structural embodiments that can be controlled to allow for the automatic connection and disconnection to the aerial vehicle 20. It is contemplated that the clamping mechanism 80 may be electro-mechanical device, a hydro-mechanical device, or a pneumatic device and this disclosure in not limited. The resulting configuration allows for structural stability during use as well as electrical communication (data and power) between the implant assembly 60 and the aerial vehicle 20. This configuration may be established by a secured attachment between the connection plate 50 and the adapter member 70. That secured attachment may be automatically controlled. Further, control of that attachment may include a fail safe wherein the clamping mechanism 80 may remain in a closed or locked position unless the aerial vehicle 20 or the implement assembly 60 is in a landed or otherwise controlled position. Various other fail safes may be programmed into the system to ensure safe operation of the hitch mount assembly 10.

Figure 6A:
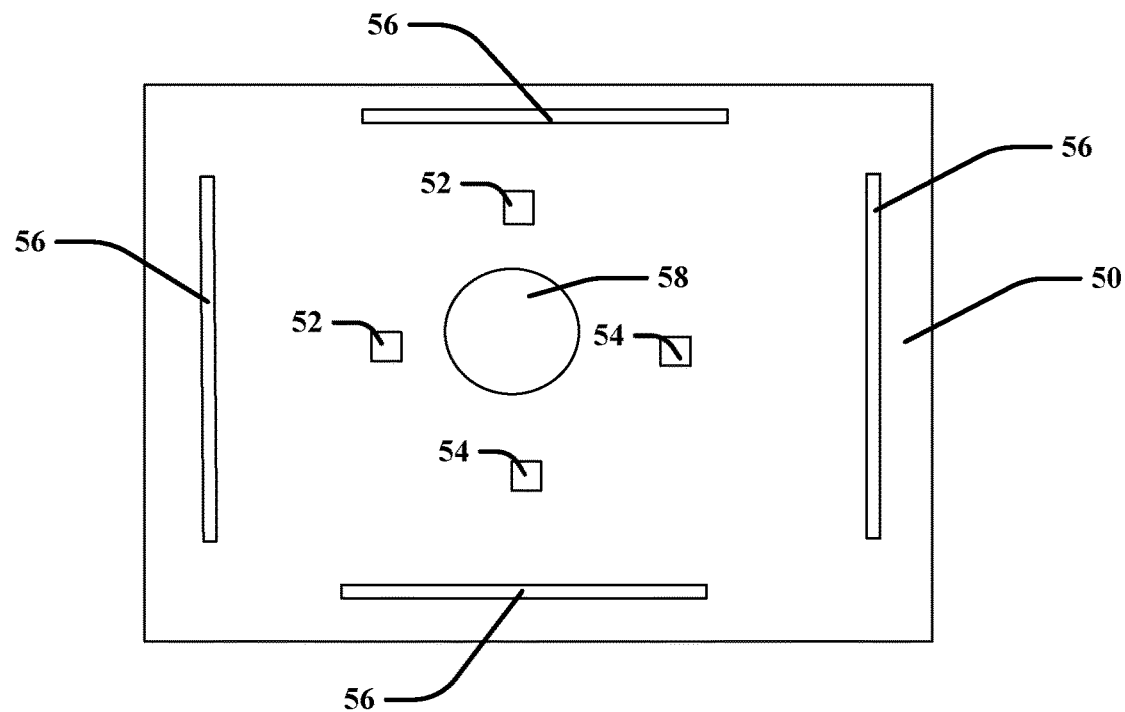
FIG. 6A is a schematic plan view of an embodiment of a connection plate of the hitch mount assembly in accordance with the instant disclosure.
Figure 6B:
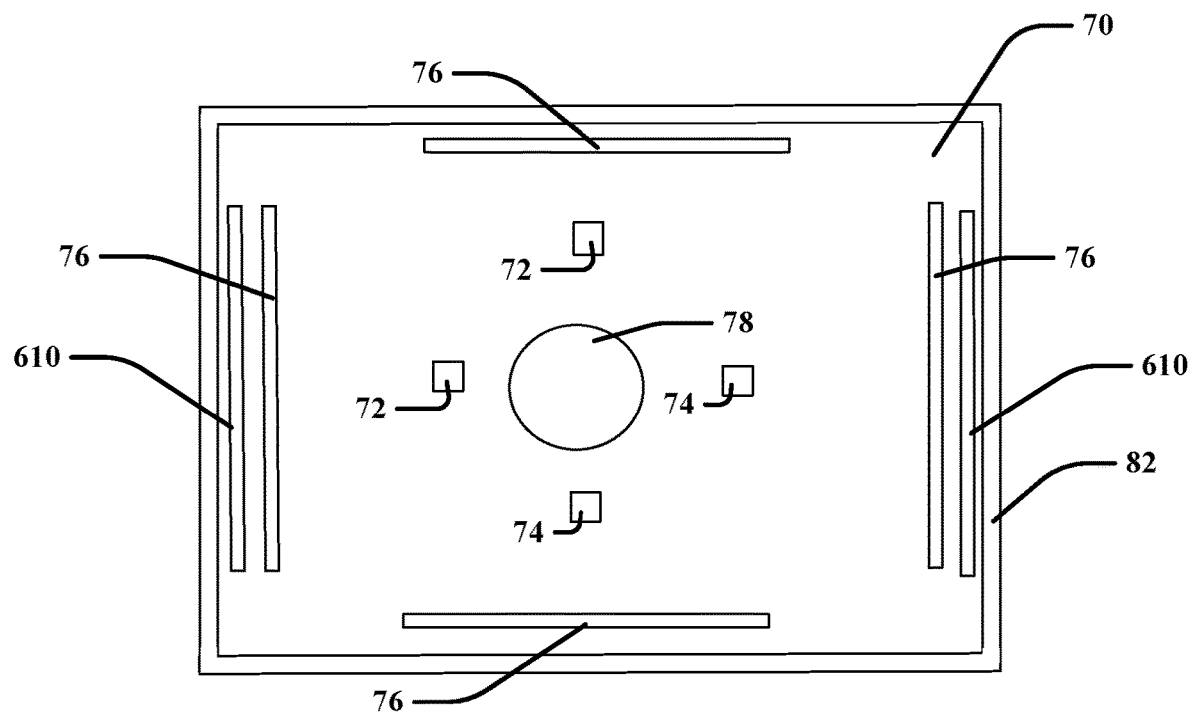
FIG. 6B is a schematic plan view of an embodiment of an attachment member of the implement assembly in accordance with the instant disclosure.

In one embodiment, the aerial vehicle 20 may be attached to the implement assembly 60 by first positioning the aerial vehicle 20 adjacent the implement assembly 60. The connector plate 50 includes a shape or pattern that may be complimentary to the shape or pattern of the attachment member 70. The connector plate 50 may be controlled to be magnetized to allow the position of the connector plate 50 to align with the position of the attachment member 70. This may be done to auto-align the electrical contacts, for example, by aligning 52 to 72 and 54 to 75 as illustrated by FIG. 2 and FIGS. 6A and 6B. FIG. 6A illustrates an embodiment of the connector plate 50 that includes electrical contacts 52, 54 as well as a complementary pattern of ridges and recesses 56 positioned on a surface 51 of the connector plate 50. Notably, FIG. 6B illustrates an embodiment of the attachment member 70 that includes electrical contacts 72, 74 as well as complementary patterns of ridges and recesses 76 positioned on a surface 71 of the attachment member 70. The surface 51 of the connector plate 50 is configured to abut against the surface 71 of the attachment member 70 wherein the complementary patterns of ridges and recesses 56, 76 assist to generally align the surfaces 51, 71 together and to position the electrical contacts 52, 54, 72, 74 in general alignment. The ridges and recesses may allow for additional alignment and prevent sliding between the surfaces. A gasket member 82 may also be positioned between the connector plate 50 and the attachment member 70 to prevent moisture from entering therebetween. Further, the connector plate 50 may include a magnet 58 and the attachment member 70 may include a magnet 78 that may be selectively operated to assist with alignment and connection. Notably, this disclosure contemplates any pattern of ridges, recesses, magnets, gaskets, and electrical contacts may be configured to assist with operation of the hitch assembly 10 and to secure alignment and abutment between the connector plate 50 and the attachment member 70. The pattern and configuration of these components are not limited.

The clamping mechanism 80 may then be engaged to pivot or move over the edges of the connection plate 50 and adapter member 70 to secure the connection plate 50 to the adapter member 70. The arms of the clamping mechanism 80 may have a variety of configurations, may include a variety of connection points between the components, and this disclosure in not limited. Notably, FIGS. 1-3 illustrate the clamping mechanisms 80 being attached along the adapter member 70. However, the clamping mechanism 80 may also be attached to the connection plate 50.

Figure 7A:
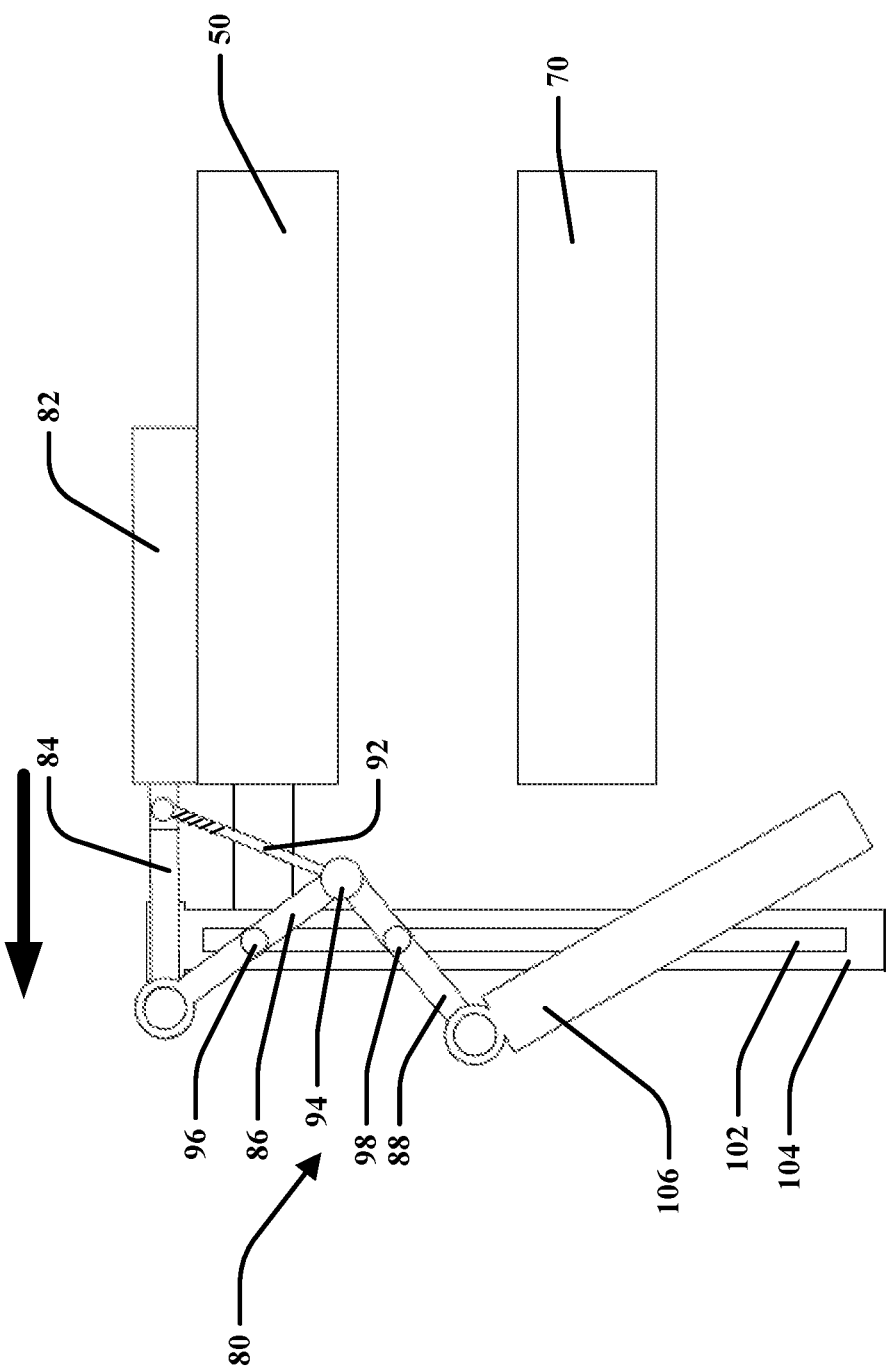
FIG. 7A is a schematic diagram of an embodiment of a clamping mechanism of the hitch mount assembly in an open position in accordance with the instant disclosure.
Figure 7B:
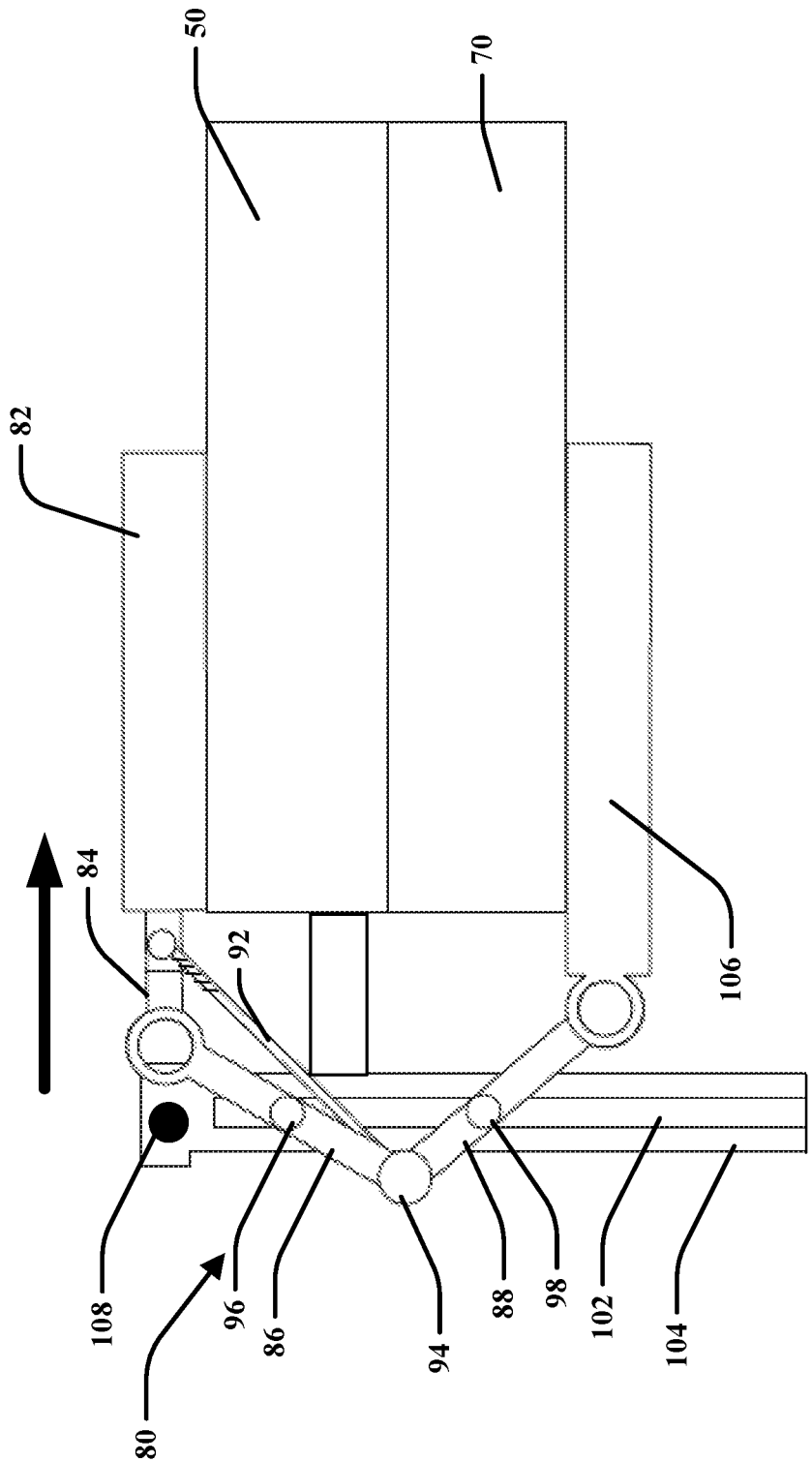
FIG. 7B is a schematic diagram of an embodiment of the clamping mechanism of the hitch mount assembly in a closed position in accordance with the instant disclosure.
Figure 8:
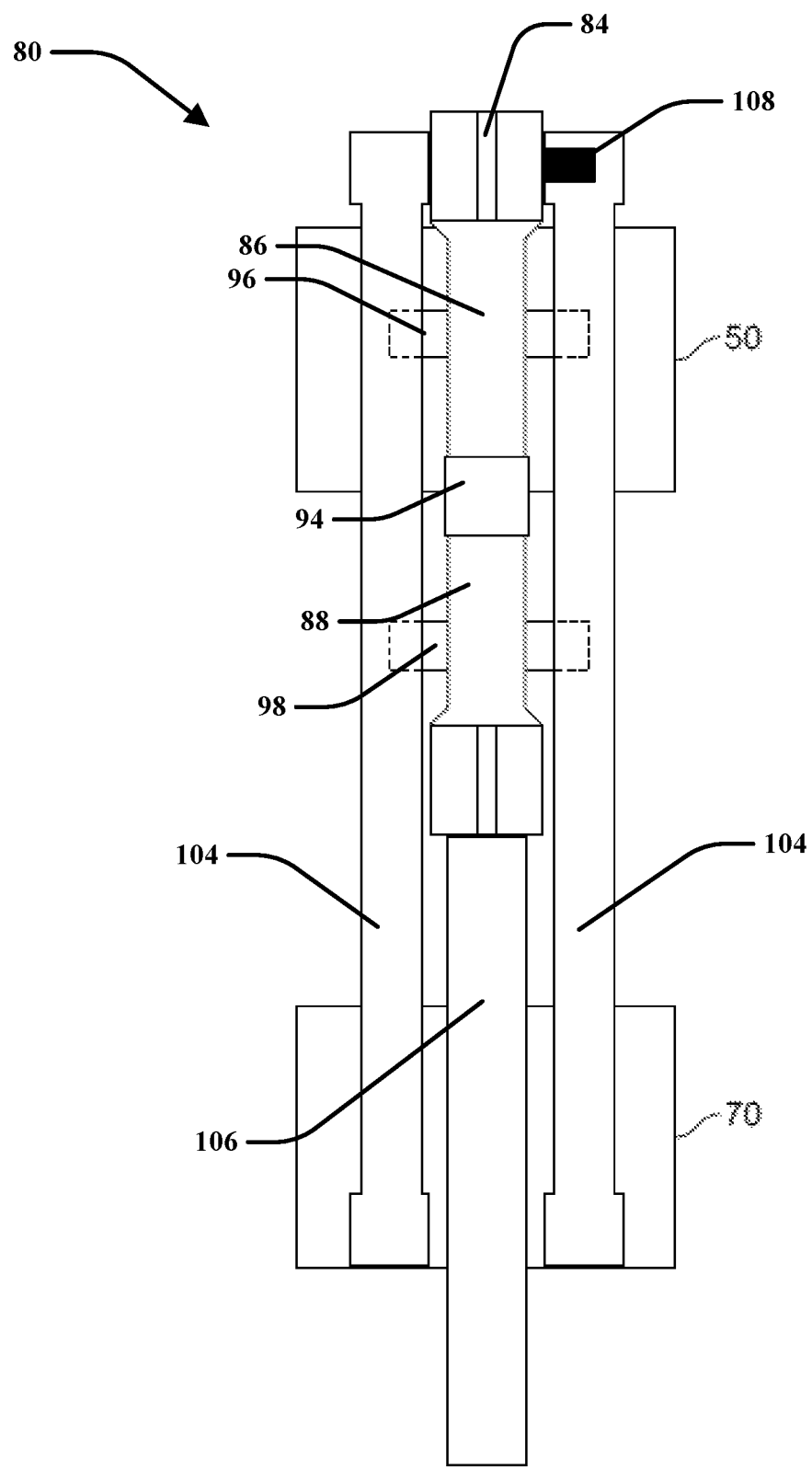
FIG. 8 is a schematic diagram of a rear view of the clamping mechanism of FIG. 7A of the hitch mount assembly.

FIGS. 7A, 7B, and 8 illustrate embodiments of the clamping mechanism 80 that may be incorporated into the hitch assembly 10. In this embodiment, the clamping mechanism 80 may be considered a cam latch assembly or an over center cam latch assembly. The clamping mechanism 80 includes an actuator 82 positioned or attached to the connection plate 50. The actuator 82 may include a piston 84 that may be translated between and extended position and a retracted position to open or close the clamping mechanism 80. The actuator 82 may be hydraulic, pneumatic or electromechanical type actuator. The clamping mechanism 80 may also include a slide track 104, a first link 86, a second link 88, an alignment bar 92, a joint 94, and a clamp member 106. The first and second links 86, 88 may each include first and second guide rollers 96, 98, respectively. The guide rollers 96, 98 may be aligned within a slot 102 defined within the slide track 104. The slide track 104 may be attached to the connection plate 50 and may include two members, each member positioned on either side of the first and second links 86, 88 as illustrated by FIG. 8. The piston 84 may be rotationally attached to the first link 86 which may be attached to the second link 88 at joint 94. The alignment bar 92 may extend from the joint 94 to a position along the piston 84. The alignment bar 92 may include a spring or bias member to allow for the alignment bar 92 to place a bias force against the joint 94. This configuration allows for the first and second links 86, 88 to pivot between an over-cam locked position with the joint 94 positioned outwardly from the connection plate 50 and attachment member 70 in the closed position (FIG. 7B) to an unlocked position with the joint positioned inwardly relative to the slide track 104 towards the connection plate 50 and attachment member 70 in the open position (FIGS. 7A and 8).

A plurality of clamping mechanisms 80 may be used with the hitch mount assembly 10. In one embodiment, two clamping mechanism are used. In another embodiment, four clamping mechanisms 80 are used. Further, six or more clamping mechanism 80 may be used. The plurality of clamping mechanisms 80 may be placed about a perimeter of the connection plate 50 or the adapter member 70 to toggle between opened and closed positions In operation, an open signal may be communicated to the actuators 82 of the plurality of clamping mechanisms 80 to place the clamp mechanisms 80 in the open position. FIG. 7A illustrates an embodiment of the clamping mechanism 80 in the open position. The open signal may be provided from a remote location or via the control unit 90. When in the open configuration, the aerial vehicle 20 may be manually operated or automatically programmed to position the connection plate 50 in alignment with the adapter member 70 and associated implement assembly 60. Here, the rotatable unit 40 may be controlled to position the connection plate 50 in an aligned position both by moving it angularly relative to the aerial vehicle 20 as well as rotating the rotatable unit 40 to align the connection plate 50 with the adapter member 70. Additionally, magnet 78 may be operated to assist with aligning the connection plate 50 to the adapter member 70.

To place the clamping mechanism 80 in the open position, the actuator 82 may translate the piston 84 in the extended position which adjusts the first link 86, second link 88 and joint 94 such that the joint is positioned towards the actuator 82 and the first and second guide rollers 96, 98 translate in alignment within the slot 102 of the slide track 104. The bias force may be provided by the alignment bar 92 against the joint 94 to assist with the movement and to maintain the clamp member 106 with clearance away from the connection plate 50. The alignment bar 92 assists with toggling and locking the clamp mechanism 80 between the open and closed position.

Further, a close signal may be communicated to the actuators 82 of the plurality of clamping mechanisms 80 to place the clamp mechanisms 80 in the closed configuration. FIG. 7B illustrates an embodiment of the clamping mechanism 80 in the open configuration. That signal may be provided from a remote location or via the control unit 90. When in the closed configuration, the aerial vehicle 20 may be aligned such that the connection plate 50 is abutting or generally in alignment with the adapter member 70 and associated implement assembly 60. In the closed configuration, the actuator 82 may translate the piston 84 in the retracted position which adjusts the first link 86, second link 88 and joint 94 such that the joint 94 is positioned away from the actuator 82 and the first and second guide rollers 96, 98 translate in alignment within the slot 102 of the slide track 104. This abuts the clamp member 106 against the adapter member 70 at a location opposite from the actuator 82 to provide a clamp force against the connection plate 50 and the adapter member 70. The bias force may be provided by the alignment bar 92 against the joint 94 to assist with the movement of the links to an over cam position and to position and maintain the clamp member 106 in the closed position against the adapter member 70.

Further, in the closed position, the attachment point of the piston 84 and the first link member 86 may be generally aligned along a top portion of the slide track 104 and include a lock member 108. The lock member 108 may be manually or automatically engaged to securely lock the clamp mechanism 80 in the closed configuration. The lock member 108 may be a button or pin that extends though an aperture in the slide track 104 and abuts against the piston 84 or first link 86 in the locked position. It may also include a bias member or other locking mechanism that selectively or automatically engages the clamp mechanism in the locked position. The lock member 108 may include various mechanisms that may be manually or automatically operated to lock the clamping mechanism 80 in the closed position and this disclosure is not limited. To disengage the lock member 108, a user may depress or remove the lock member 108 or an unlock signal may be received from the control unit 90 to automatically disengage the lock member 108 to allow the piston 84 to translate between the extended and retracted position to pivot the links and clamp member 106 between the open and closed configuration.

The implement assembly 60 may include the control unit 90 that is in communication with the hitch mount assembly 10 and the aerial vehicle 20. The control unit 90 may allow for communication and control of the implement device 62 through the aerial vehicle 20 or wirelessly through a remote network or system. The control unit 90 may be in electrical communication with each of the components of the hitch mount assembly 10 once the hitch mount assembly is attached to the implement assembly 60. The control unit 90 may communicate with the aerial vehicle 20, rotatable member 40, connection plate 50, adapter member 70, clamping members 80, telescoping member 100, lock member 108 as well as the remote network or system. In one embodiment, the described operation may be performed autonomously without input from a remote control or user. Optionally, the user may manually control the aerial vehicle 20 and hitch mount assembly 10 through the various steps to align and selectively attach, operate the aerial vehicle 20, and detach the implement assembly 60 from the hitch mount assembly 10.

In operation, the aerial vehicle 20 may be controlled to be positioned over the impellent assembly 60. The connection plate 50 may be placed adjacent to the adapter member 70. The clamping mechanism 80 may clamp or lock the connection plate 50 to the adapter member 70. Further, once the clamping mechanism 80 is in the closed or locked position, the hitch mount assembly 10 may undergo a calibration procedure. The calibration procedure may verify that electronic communication between the various components has been properly achieved. It may also coordinate particular information between the aerial vehicle 20, implement assembly 60, controller 90 and the remote network or system. This step may verify and identify the relative position, weight, and type of implement device 62 and aerial vehicle 20 to coordinate the desired operation of the combined assembly. This calibration step may verify that electrical data connection and power connection has been established to properly operate the implement device 62. Further, any other data may be remotely communicated to ensure that the desired purpose of the implement device may be programmed as desired. The hitch mount assembly 10 may also undergo a self test step to verify the secured connection between the hitch mount assembly 10 and the implement assembly 60 as well as to determine various other data points that may be known to properly fly the aerial vehicle 20 and to operate the implement device 62 in a desired manner.

Further, the control unit 90 may continuously monitor the aerial vehicle 20 and hitch mount assembly 10 to ensure stabilization. The communication between the control unit 90 and the various components described herein allow for the control of the aerial vehicle 20 to be coordinated to ensure stabilization during flight both with and without the implement assembly 60 attached to the hitch mount assembly 10. The implement assembly 60 may have a range of weights and configurations that may require flight adjustments for a successful flight and the disclosed system accounts for the variety of sizes and weights of implement assemblies 60 that may be attached to the respective aerial vehicle 20. The control unit 90 may undergo a load stabilization step that may account for various characteristics to allow for adjustments and operational control of the aerial vehicle 20 and hitch mount assembly 10. These characteristics may include but are not limited to: air data, flight path, altitude, pitch, roll, yaw, gyroscopic forces, GPS, inertia, outside atmosphere conditions both calculated and observed. These characteristics may be included in an programmable logic or algorithm to allow for automatic stabilization. The control unit 90 may also include a programmable logic or algorithm that includes a guidance system to assist with operating the aerial vehicle 20. The guidance systems may include a DGPS, Inertial Navigation Signal, cellphone compatible GPS, marker stakes positioned on a field, or single satellite GPS. The control unit 90 may be programmed to include a logic or algorithm that utilizes the guidance system and load stabilization steps to automatically align the aerial vehicle 20 and associated rotatable unit 40 and connection member 50 to the adapter member 70 and associated implement assembly 60 as well as to attach/detach the clamping members 80 and to operate the aerial vehicle 20 with and without the implement assembly 60 attached to the hitch mount assembly 10. The algorithm may be a logic programmed into memory stored on the control unit 90 or communicated to the control unit 90 over a network from a remote location or device such as a cell phone, computer, tablet, or server.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The control unit 90 may communicate to various computers, devices, or servers through a communication framework having the ability to communicate through a wireless network. Communication connection(s) may include devices or components capable of connecting to a network. For instance, communication connection(s) may include cellular antennas, wireless antennas, wired connections, and the like. Such communication connection(s) may connect to networks via the communication framework. The networks may include wide area networks, local area networks, facility or enterprise wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework may include multiple networks connected together. For instance, a Wi-Fi network may be connected to a wired Ethernet network.

In another embodiment, an emergency jettison system 610 (FIG. 6B) may be incorporated into the hitch mount assembly 10. The jettison system 610 may account for emergency situations to improve the safe operation of the aerial vehicle 20 as well as the hitch mount assembly 10 and associated implement assembly 60. The jettison system may include a mechanical or electrical device that may automatically determine if a failure event has occurred to the aerial vehicle 20 and may communicate with the control unit 90 to determine if the implement assembly 60 attached to the hitch mount assembly 10 is to be jettisoned from the hitch mount assembly 10. The control unit 90 and jettison system 610 may communicate to automatically determine a preferred safe location to detach the implement assembly 60 from the aerial vehicle 20. In one embodiment, the jettison system 610 may include a mechanical device configured to disengage the clamping mechanism 80 such that it may automatically unlock and place the clamping mechanism 80 in the open position when a predetermined failure event has occurred. In another embodiment, the jettison system 610 may include directive explosives that may operate to disengage the implement assembly 60 from the hitch mount assembly 10 when a predetermined failure event has occurred. The directive explosives may operate to damage the hitch mount assembly 10 in such a way as to detach the implement assembly. The sensed failure event may include triple redundant charges to improve safe operation. The implement assembly 60 may or may not include a ballistic parachute as it depends on the type if implement assembly.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A hitch mount assembly for an aerial vehicle comprising:
   a mount body selectively attached to an aerial vehicle;
   a rotation unit rotatably and pivotally attached to the mount body;
   a connection plate attached to the rotation unit; and
   a clamping mechanism that is automatically operable to move between an open position to align or detach the connection plate relative to an implement assembly and a closed position to secure the connection plate to the implement assembly;
wherein the clamping mechanism further comprises:
   at least one actuator, the actuator includes a piston translatable between and extended position and a retracted position to place the clamping mechanism in the open position or the close position;
   a slide track attached to the connection plate;
   a first link pivotally attached to the piston;
   a joint pivotally attached to the first link and a second link;
   the second link attached to a clamp member;
   the first and second links each include first and second guide rollers aligned within a slot defined within the slide track; and
   an alignment bar that extends from the joint to a position along the piston;
   wherein the first and second links are moveable to place the clamping mechanism in said closed position and said open position, in said closed position, the joint is located outwardly from the connection plate and in said open position, the joint is located inwardly towards the connection plate.

2. The hitch mount assembly of claim 1 further comprising an attachment member attached to said implement assembly, wherein the connection plate includes at least one electrical contact and said attachment member includes at least one electrical contact wherein the electrical contact on the connection plate is configured to be aligned with the electrical contact on the attachment member to establish electronic communication between the hitch mount assembly and the implement assembly.

3. The hitch mount assembly of claim 1 wherein the aerial vehicle is an unmanned aerial vehicle (UAV) that is remotely controlled or automatically programmed to align the connection plate with the implement assembly and is remotely controlled or automatically programmed to selectively position the clamping mechanism between the open position and closed position.

4. The hitch mount assembly of claim 1 wherein the mount body and the rotatable unit include a ball and socket coupling orientation.

5. The hitch mount assembly of claim 4, wherein the mount body includes a socket that defines a cavity with a cavity opening to receive a head portion of the rotatable unit within the cavity wherein the position of the rotatable unit relative to the mount body is controlled by at least one electromagnet on the mount body or the rotatable member.

6. The hitch mount assembly of claim 1 further comprising a control unit in electronic communication with at least one of the aerial vehicle, mount body, rotatable unit, and clamping mechanism, wherein the control unit is in wireless communication with a network to allow for electronic communication with a remote computing device.

7. The hitch mount assembly of claim 6, wherein the angular and rotational position of the rotatable unit relative to the mount body is manually or automatically controlled via the control unit.

8. The hitch mount assembly of claim 1, wherein the connection plate includes an electromagnet that is selectively controlled to align the connection plate relative to the implement assembly.

* * * * *